Feb. 15, 1938.    M. W. BRADY    2,108,743
AXLE HOUSING AND WHEEL ALIGNMENT GAUGE
Filed June 22, 1937
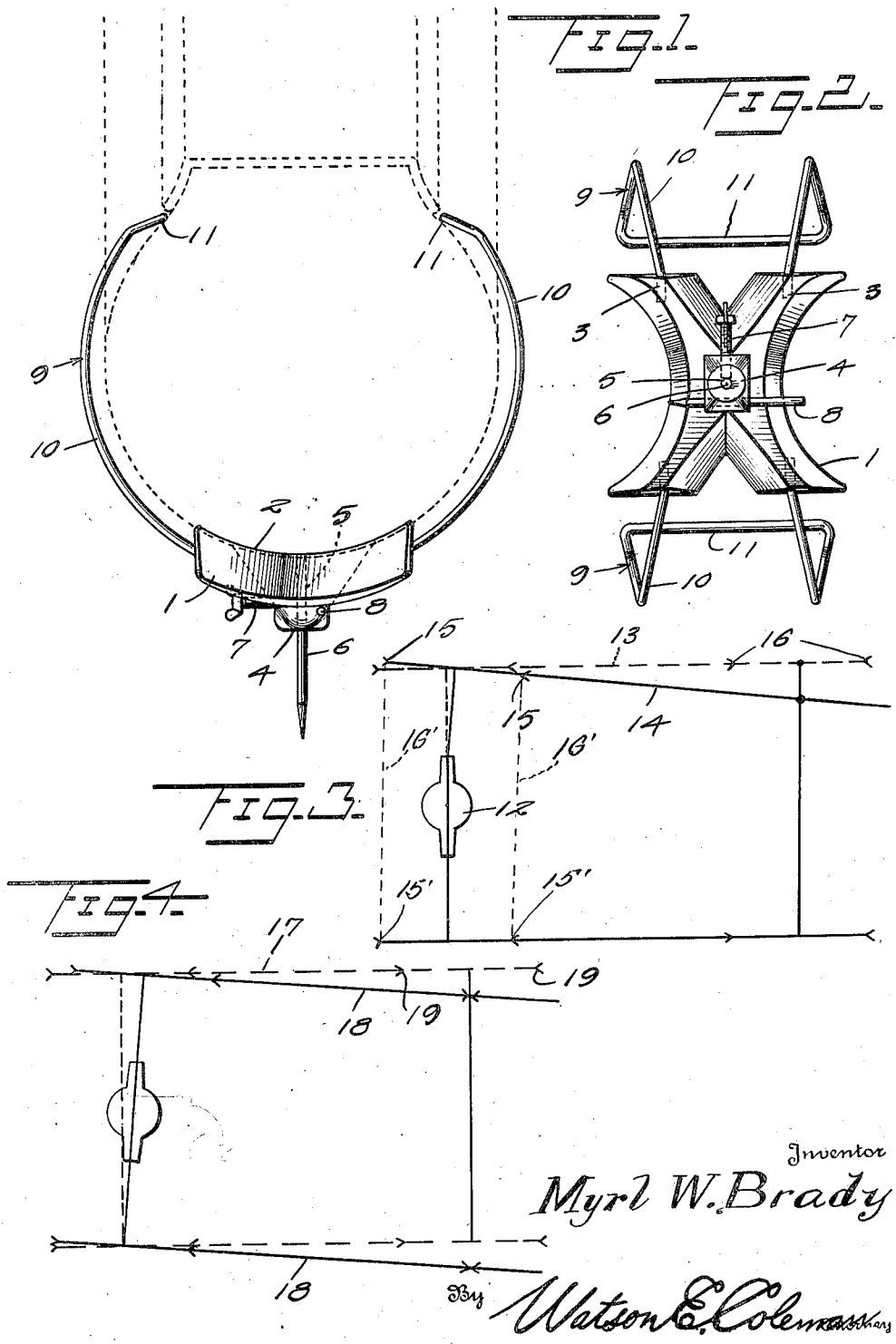
Inventor
Myrl W. Brady
By Watson E. Coleman

UNITED STATES PATENT OFFICE 2,108,743

AXLE HOUSING AND WHEEL ALIGNMENT GAUGE

Myrl W. Brady, Tarentum, Pa.

Application June 22, 1937, Serial No. 149,765

5 Claims. (Cl. 33—203)

This invention relates to improvements in devices for aligning the wheels of motor vehicles and for determining certain inaccuracies in connection with the axles of the vehicle.

The invention has for its primary object to provide an improved simple form of device by means of which an accurate determination may be made of the condition of the front and rear axles of a motor vehicle and particularly the rear axle and axle housing, for the purpose of determining whether or not the latter are in the proper right-angular relation with the longitudinal center of the vehicle.

Another object of the invention is to provide an improved means of determining whether or not the rear axle housing of a motor vehicle is bent or has shifted forwardly or rearwardly upon the vehicle springs so as to bring about a misalignment of the front and rear wheels.

Still another object of the invention is to provide a device for making the above-described determinations, which is readily applied to a wheel and which may be economically manufactured and which in use does not require any specialized knowledge on the part of the operator.

The invention will be best understood from a consideration of the following detailed description taken in connection with the accompanying drawing forming part of this specification, with the understanding, however, that the invention is not confined to any strict conformity with showing of the drawing but may be changed or modified so long as such changes or modifications mark no material departure from the salient features of the invention as expressed in the appended claims.

In the drawing:

Figure 1 is a view in side elevation of a device constructed in accordance with the present invention, the same being shown in association with a dotted-line representation of the vehicle tire.

Fig. 2 is a view in bottom plan of the device.

Fig. 3 is a diagram illustrating the result obtained in the use of the device where the rear axle housing may be bent on one side of the differential.

Fig. 4 is a diagram representing the result obtained in the use of the device where the rear axle housing may have shifted upon the springs.

Referring now more particularly to the drawing, the numeral 1 generally designates a body of any suitable form which has a top surface 2 formed to substantially conform to the tread surface of a motor vehicle. The device illustrated has the two arms 3 at each of its ends and at the point of joinder between the arms of one end with those of the other end, there is formed an outstanding boss 4 which is provided with a central aperture 5 which passes transversely through the body. This aperture is provided to receive an end of a marking pin 6 and the boss has a suitably threaded aperture formed in one side thereof which extends as far as the passage 5 in which the pin is mounted and which receives a thumb-screw 7, the inner end of which contacts the pin 6 to secure it firmly in position.

The boss 4 also has formed transversely therethrough at right angles to the screw 7, a suitable passage for frictionally receiving and holding a marking stylus 8.

Extending from each of the two ends of the body is an arcuate resilient wire frame which is generally designated by the numeral 9. This frame has the two side portions 10, each of which has an end secured in the outer end of an arm 3, and a cross piece or bar 11 which couples the other ends of the portions 10. These two portions 10 are so formed as to substantially conform to the curvature of one side of a motor vehicle tire so that when the outer ends of the tire gripping frames 9 are sprung apart, the device may be mounted on a tire in the manner illustrated in Fig. 1 and the inherent resiliency of the frames will grip the tire and maintain the body 1 in the desired position against the tire tread with the pin 6 extending radially of the tire and the wheel on which it is mounted.

While the body 1 has here been illustrated and described as having end arms from each of which a side portion 10 of a frame 9 extends, it is to be understood that the invention is not to be limited to the specific body shown, as it will be apparent that a body of some other form might be employed.

In the use of the present device, the motor vehicle which is to be tested for straightness of axles and axle housing or for alignment of front or rear wheels, is raised from the floor surface sufficient to permit free rotation of the wheels. The gauges are then applied to the proper wheels for making the desired tests, either a test for the determination of the straightness of the rear axle housing, the determination of the straightness of the front axle or a determination of the condition of the side beams of the vehicle chassis. In making a test to determine whether or not the rear axle housing of the vehicle may be bent, a gauge is placed upon each of the rear wheels of the raised vehicle, being engaged on the tire and held in place by the resilient armed frames 9, in the manner illustrated in Figure 1. Each of the wheels will then be rotated in a clockwise direction until the point of the pin 6 contacts the floor and by the use of the stylus 8 or any other suitable marking instrument, the point on the floor where the pin 6 touches will be marked. The wheels will then be given a counterclockwise rotation until the points of the pins 6 touch the floor at the rear of the wheels and the point of contact will be marked in any suitable manner. After the four points have been marked on the floor in the manner described, a measurement will be made transversely of the vehicle between the points on the forward sides of the wheels and a similar measurement will be made transversely of the vehicle between the points at the rear of the wheels and if the axle housing is perfectly straight the distances obtained should be the same for the front and rear.

Figure 3 illustrates the manner in which the marked points will be obtained upon the floor surface if one side or end of the rear axle housing is bent. The numeral 12 designates the car differential and the broken line 13 represents the line which would be obtained between points marked off upon the floor at the front and rear of the front and rear wheels upon one side of the vehicle if the rear axle housing and the front axle are straight. The line 14 designates the angle which would be formed by a continuation of a line drawn between the points 15 which represent the marks made upon the floor by the pins 6 when the adjacent portion of the axle housing is bent. It will be seen that this line forms an acute angle with the broken line 13 and does not pass through the points 16 as it would do if the axle were not bent.

As previously described the determination of the straightness of the rear axle housing is readily obtained by measuring transversely of the vehicle along the broken lines 16', between the points 15 at one side of the vehicle and the points 15' at the opposite side. It will be readily seen from this diagram that the front line 16' will be shorter than the rear one thus indicating that the axle housing at one side of the differential 12, is bent forwardly. By the extension of a line through the points 15 and forwardly beyond the points 16 which might be obtained upon the floor in the manner previously described in connection with the use of the marker, a determination may be readily obtained as to which side of the axle housing is bent and also whether the misalignment applies to one side only or to both sides.

The diagram designated Fig. 4, shows the method of determining whether or not the rear axle housing has become shifted forwardly or rearwardly upon the springs. If points are marked upon the floor at the front and rear of the front and rear wheels, by using the gauge on each wheel in the manner previously stated, lines drawn longitudinally of the vehicle between the points adjacent the rear wheels, should pass through the points obtained under the front wheels as indicated by the broken lines 17, but if the rear axle housing has shifted the extension of the lines passing through the markings made in association with the rear wheels will pass to one side, as indicated at 18, of the points 19 under the front wheels. From this it may be readily determined the degree to which the axle housing has shifted from its right angular or perpendicular relation with the longitudinal center of the vehicle frame.

The marker or gauge device described may also be used on the front wheels of the vehicle to determine whether or not they are in the proper parallel relation, as it will be apparent that when the wheels are rotated to obtain the two marked points as described, and a line is laid off passing through these two points, it will pass to one side of the points laid off beneath the rear wheels if the front wheels are not properly lined up. A determination also may be made of the correct position of the front wheels by laying off a cross line paralleling the front axle and then determining whether or not the line passing through the two marked points obtained in the manner described, is perpendicular to the transverse line.

In order that the device may be readily used upon all sizes of tires, the ends of the side portions 10 of the frames 9 are frictionally secured in suitable recesses in the ends of the portions 3 of the body of the device. By providing frames of different sizes the necessary substitution may be made to adapt the device to any size of tire merely by withdrawing the ends of the sides 10 from the sockets in which they are secured and replacing the frame with one of a larger or smaller size.

From the foregoing it will be readily apparent that the device herein described, while of extremely simple construction, may be employed to accurately determine conditions which, at the present time, are determined only by the use of complicated and expensive apparatus. It will also be apparent that the use of the device is simple and that because of its simplicity, may be easily and quickly mounted upon the wheels so that the desired determinations may be made with a minimum expenditure of time.

What is claimed, is:

1. A gauge device of the character described, comprising a body adapted to be disposed against the tread surface of a motor vehicle wheel, means carried by the body for detachably securing the same to said surface, and pointer means carried by the body facilitating the laying off upon an underlying surface of indicia necessary for determining the relation of the motor vehicle wheel to an adjacent axle or axle housing.

2. A gauge device of the character described, comprising a body adapted to be disposed against the tread surface of a vehicle wheel, resilient arms carried by the body for engagement across the sides of the wheel to maintain the body in position thereagainst, and a pointer carried by the body and extending therefrom in a manner to be disposed radially of the wheel when the body is applied thereto.

3. A device of the character described, comprising a body having a top surface formed to conform substantially to the tread surface of a vehicle tire, a pair of laterally and upwardly curving resilient arms carried by the body and having their free ends disposed in opposed relation, a boss formed upon the under surface of the body and having an aperture extending therethrough in a direction to extend radially of a wheel to which the body is attached, and a pointed pin adjustably secured in said passage and having its pointed end directed away from the body.

4. The method of determining the straightness of the rear axle housing of a motor vehicle, which comprises raising the rear wheels of the vehicle sufficiently to permit free rotation of said wheels, fixing a pointer on each wheel at the peripheral center, rotating both wheels in one and the same direction to bring said pointers in contact with the underlying surface, marking the points of engagement of the pointers with the surface, reversely rotating both wheels to bring the pointers in contact with the surface at the opposite sides of the wheels, marking the surface where each wheel carried pointer contacts, and then measuring the distances transversely of the vehicle between the points marked at the fronts of the wheels and the points marked at the backs of the wheels to determine whether or not such distances are equal.

5. The method of determining the proper alignment of the front and rear wheels of a motor vehicle, which comprises raising the vehicle from the ground sufficiently to permit free rotation of all of the wheels, fixing a pointer at the peripheral center of each wheel and rotating each wheel in a clockwise and counter-clockwise direction to bring the pointer carried thereby into contact with the ground at the front and rear of the wheel, marking upon the ground the point engaged by the pointer, and striking a line across the two points obtained adjacent one wheel and extending it longitudinally of the vehicle beyond the points obtained under the wheel upon the adjacent side of the vehicle, a proper alignment of the wheels upon one side of the vehicle being indicated by passage of the line through the four points obtained in association with the two adjacent wheels.

MYRL W. BRADY.